324-77 CROSS REFERENCE SEARCH ROO

WAVEFORM RECOGNITION SYSTEM

Filed Dec. 10, 1965

3 Sheets-Sheet 1

INVENTORS.
DAVID E. DYKAAR &
BERNARD J. STEIN
BY
Brumbaugh, Free, Graves & Donohue
their ATTORNEYS INVENTORS.
DAVID E. DYKAAR &
BERNARD J. STEIN
BY Brumbaugh, Free, Graves & Donohue
their ATTORNEYS

WAVEFORM RECOGNITION SYSTEM

Filed Dec. 10, 1965

INVENTORS.
DAVID E. DYKAAR &
BERNARD J. STEIN
BY Brumbaugh, Free, Graves & Donohue
their ATTORNEYS United States Patent Office 3,535,682
Patented Oct. 20, 1970

3,535,682

WAVEFORM RECOGNITION SYSTEM

David E. Dykaar, Great Neck, and Bernard J. Stein, Jamaica Estates, N.Y., assignors to Lundy Electronics & Systems, Inc., Glen Head, N.Y., a corporation of New York Filed Dec. 10, 1965, Ser. No. 512,892
Int. Cl. G06k 9/18
U.S. Cl. 340—146.3 30 Claims

ABSTRACT OF THE DISCLOSURE

A system for recognizing a waveform by determining the relative amplitude of the waveform at selected times relative to the beginning of the waveform, generating digital signals representative of the relative amplitude at the selected times, and generating a signal identifying the waveform in response to the digital signals.

This invention relates to a waveform recognition system and, more particularly, to a method and apparatus for identifying a particular one of a plurality of waveforms.

Such waveform recognition apparatus has wide application, for example, in the reading of detectable characters on documents such as checks or deposit tickets in the banking industry. The data on such documents may be processed by a computer and may also control suitable document sorting apparatus. Such sorting apparatus is disclosed in our patent application Ser. No. 460,136, now Pat. No. 3,363,756 filed June 1, 1965, for "Document Handling System," which is assigned to the same assignee as the present application.

Especially complex and critical circuitry has been used in the past for reading the characters on documents. For example, in some systems it has been necessary to compare the electrical waveforms generated in response to each character with numerous characteristics stored in a memory unit or by correlation with a set of simulated waveshapes accomplished with resistor matrices which are properly weighted for each character. Prior art character readers often require tapped delay lines for translating the information which is produced serially as each character is scanned into a parallel input signal which can be accepted by logic circuitry. Such tapped delay lines are never ideal, as inherent losses distort the waveshapes fed therethrough. Also, a delay line must be terminated in such a way as to prevent a reflected wave from distorting a waveshape representing a given character. In addition, such critical networks drift out of adjustment as the circuit values of the components change with time.

These and other disadvantages of the prior art are obviated in the present invention by exposing the characters on a document to a transducer, generating an analog electrical signal representative of each character exposed to the transducer, determining the relative amplitude of the electrical signal at selected times relative to the beginning thereof, generating digital signals representative of the relative amplitude of the electrical signal at the selected times and, if desired, generating signals identifying the characters in response to the digital signals.

For a more complete understanding of the invention, reference may be had to the following detailed description of exemplary embodiments taken in conjunction with the accompanying figures of the drawings, in which.

Figure 1:
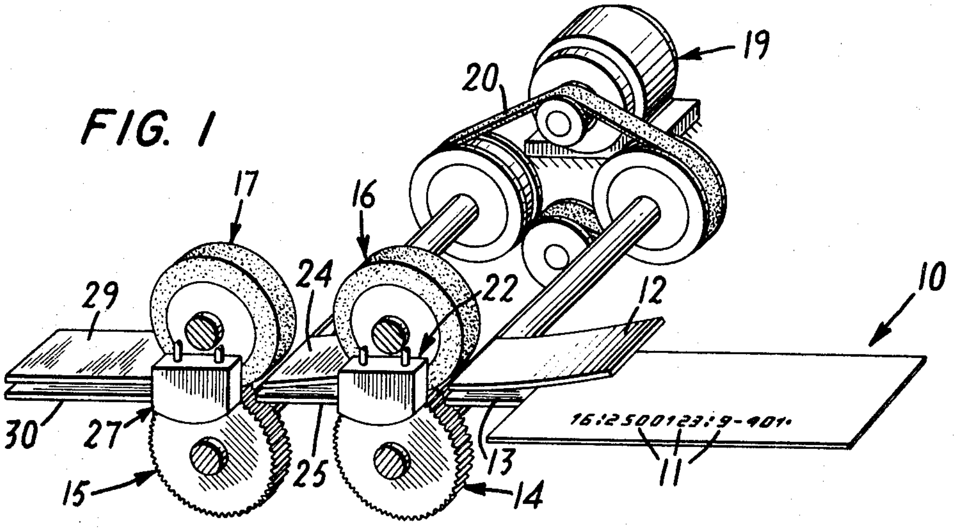
FIG. 1 is a simplified perspective view of mechanical apparatus for exposing the characters on a document to a transducer for an exemplary embodiment of waveform recognition apparatus in accordance with the present invention.

Referring now to FIG. 1, a document 10 bearing a plurality of magnetic ink characters 11, for example, is conveyed by any suitable mechanical drive (not shown) between a pair of guides 12 and 13 to pairs of drive rollers 14 and 15 against which pairs of idler rollers 16 and 17 are respectively spring-biased. The drive rollers 14 and 15 which are composed of a non-magnetizable material such as aluminum and are formed with knurled document-engagement surfaces, are driven by a conventional synchronous motor 19 through a belt drive 20. The synchronous drive insures that each document is conveyed past the reading head at exactly 150 inches per second, for example, inasmuch as the waveform generated by the reading head is dependent upon the speed of the document passing thereby. The pairs of idler rollers 16 and 17 have resilient document-engaging surfaces composed or rubber, for example, and are spring-biased against the corresponding pairs of knurled rollers 14 and 15 in order to insure that documents fed thereto are securely grasped and do not become twisted due to the drag caused by the reading head, for example.

Disposed between the pair of idler rollers 16 is a magnetic charging head 22 for magnetizing each magnetizable character which passes in flux-linking relation therewith. A pair of guides 24 and 25 insure that a document is transported from the charging head 22 to the bite between the drive rollers 15 and the idler rollers 17. Disposed between the pair of idler rollers 17 is an electromagnetic reading head 27 which generates a signal in response to and representative of each character passing in flux-linking relation therewith.

Downstream of the reading head 27 there are provided a pair of guides 29 and 30 which feed the documents to a suitable mechanical drive (not shown) for transporting the documents to the pockets of a sorting apparatus such as disclosed in the aforemetioned copending patent application Ser. No. 460,136, or to a conventional stacking device or the like. Preferably resilient means (not shown) are provided for causing the desired sliding engagement between each document and the heads 22 and 27 such as are disclosed in the copending application Ser. No. 460,136, but a detailed discussion of this is not necessary to the present invention.

The manner in which an identifying signal is generated from a particular detectable character passing beneath the reading head 27 will now be described for the case in which the characters are printed on a document with magnetic ink. In particular, the magnetic ink characters, sometimes called MICR (magnetic ink character recognition) characters, which have been adopted by the Bank Management Committee of the American Bankers Association will be considered with respect to this exemplary embodiment. These characters are shaped in a font designated as type E–13B, and the detailed specifications of the characters themselves and their location on a check may be found in Bank Management Publication 147 R2, published by The Bank Management Committee of the American Bankers Association, 90 Park Ave., New York, N.Y. The characters consist of the numerals "0" through "9," as well as the four cue symbols: "On-Us," "Transit Number," "Dash" and "Amount." These characters are described more fully in the aforementioned publication, as well as in the copending application Ser. No. 460,136.

Figure 2:
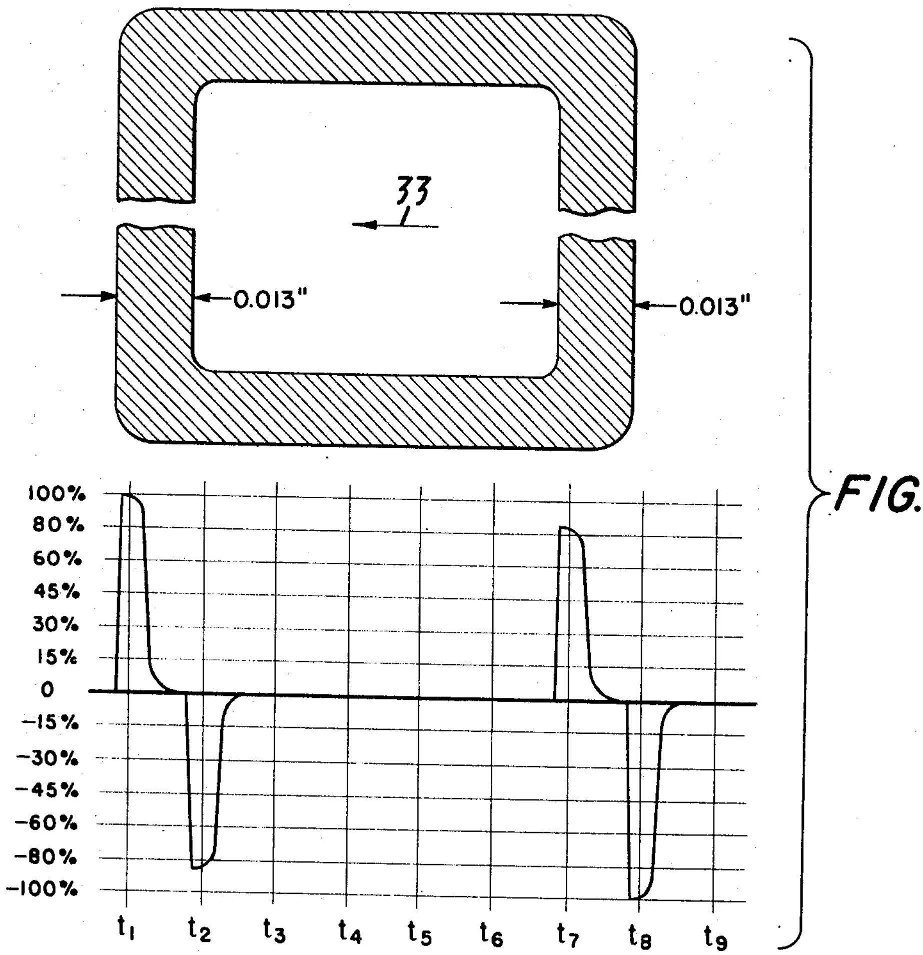
FIG. 2 depicts an exemplary form of detectable character "0" and a typical waveform of the signal generated by a magnetic reading head if the "0" is magnetized and is passed in flux-linking relation to the transducer.

FIG. 2 depicts the character "0" and a typical waveform of the signal generated by the electromagnetic reading head 27, if the "0" is magnetized by the charging head 22 and passed in flux-linking relation to the reading head 27 in the direction shown by the arrow 33. It can be seen that all changes in shape of the character "0" occur in increments of 0.013 inch, which is true for all types of E-13B characters. The typical waveforms for the other E-13B characters are depicted in the aforementioned application Ser. No. 460,136.

Inasmuch as all changes in dimension of the characters occur in increments of 0.013 inch and the characters are driven past the reading head 27 at exactly 150 inches per second by the synchronous drive motor 19, it is apparent that either positive or negative pulses of variable amplitude dependent upon the configuration of the given character will occur in increments of 86.6 microseconds in the waveform generated by the reading head 27, depending upon whether the area of the magnetized character increases or decreases, respectively. Furthermore, the positive and negative pulses may only occur at eight distinct times, which may be designated $t_1$ through $t_8$, inasmuch as none of the MICR characters are wider than the numeral "0." At the time $t_9$, a reset pulse is generated to reset some of the electrical circuitry, as will be discussed more fully hereinafer.

The characters are identified by the apparatus, in accordance with the present invention, by determining the polarity and relative magnitude of the analog signals generated by the reading head 27 at the various times $t_1$ through $t_8$. The waveform for the numeral "0" in FIG. 2 bears a grid of relative magnitude levels which are percentages of the amplitude of the first positive pulse, which always occurs at the time $t_1$. These magnitude levels have been arbitrarily selected in the illustrative embodiment illustrated as 15%, 30%, 45%, 60%, 80%, and 100% of the lead edge or $t_1$ pulse. In a particular case, the number of magnitude levels required will depend upon the degree of similarity of the particular set of waveforms from which one particular waveform must be identified.

If the magnitude level of a character's waveform is known at each of the time increments $t_1$ through $t_8$, the relative magnitude levels may be successively sensed at these time intervals to generate digital signals representative of the waveform.

From the waveform of FIG. 2, it can be seen that the numeral "0" may be identified by recognizing a negative pulse at $t_2$ the absolute magnitude of which is equal to or greater than 80% of that of the lead edge or $t_1$ pulse, a positive pulse at $t_7$ having an absolute magnitude equal to or greater than 80% of that of the lead edge pulse, a negative pulse at $t_8$ equal to or greater than the absolute magnitude of the lead edge pulse, and the absence of any pulses at the times $t_3$ through $t_6$. In practice, however, such stringent amplitude requirements would result in a high rate of characters not being read. In addition, it is not necessary to require a signal or the absence thereof at all eight time periods in order to identify one of only fourteen possible E-13B characters.

It should be further noted that a positive pulse will always occur at time $t_1$, when the leading edge of the magnetized character passes the reading head 27, so there can never be a negative pulse at $t_1$. Therefore, there is not a required input corresponding to the time $t_1$ for the logic of any of the characters. In addition, the last pulse produced by any character is always negative, although the time of occurrence of this final negative pulse depends upon the width of the given character (some of the characters being narrower than the numeral "0").

Figures 3, 6:
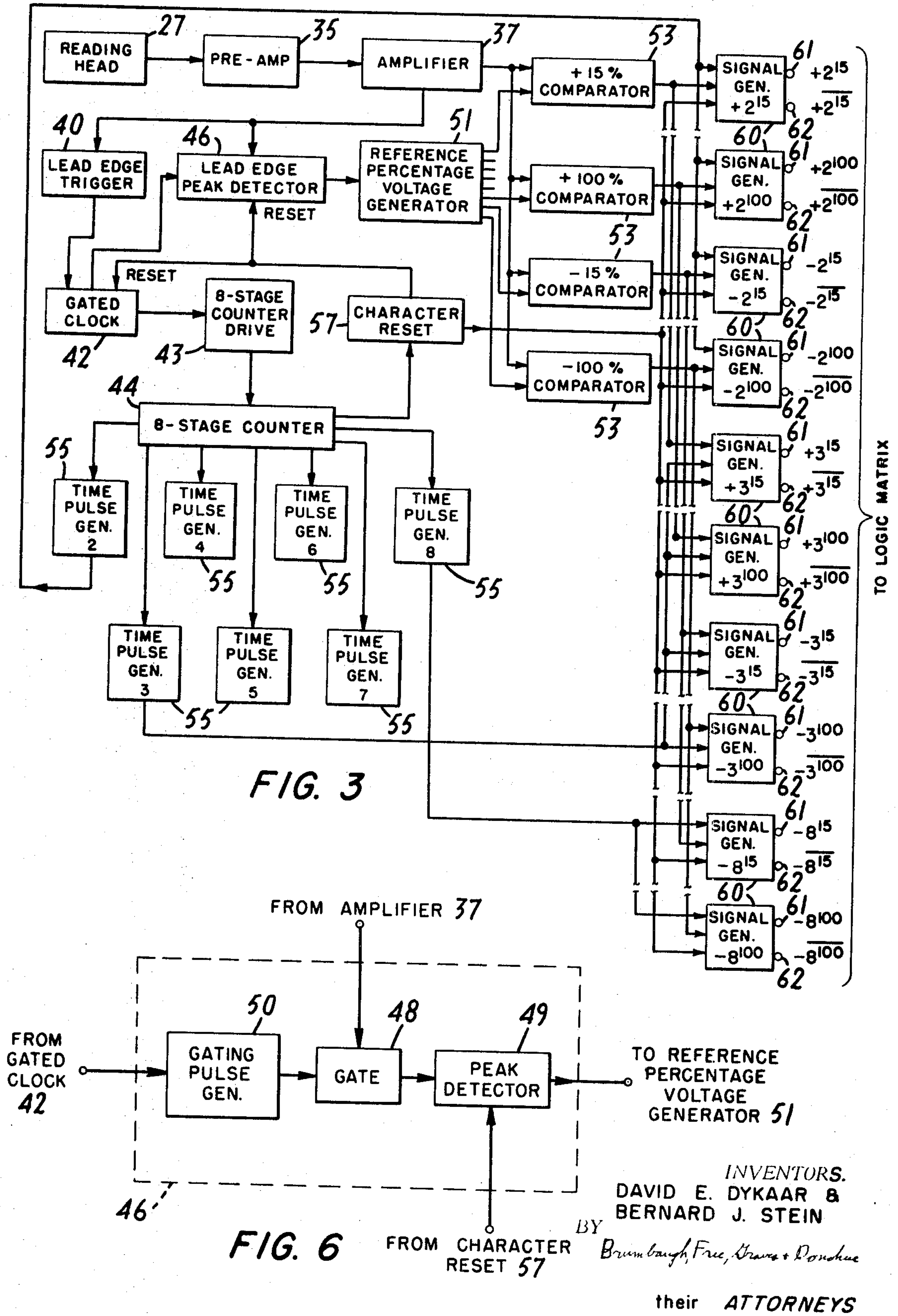
FIGS. 3 and 4 are interconnected block diagrams of electrical circuitry used in the waveform recognition apparatus in accordance with the invention.
FIG. 6 is a block diagram of the lead edge peak detector in the block diagram of FIG. 3.
Figures 3A, 4, 5:
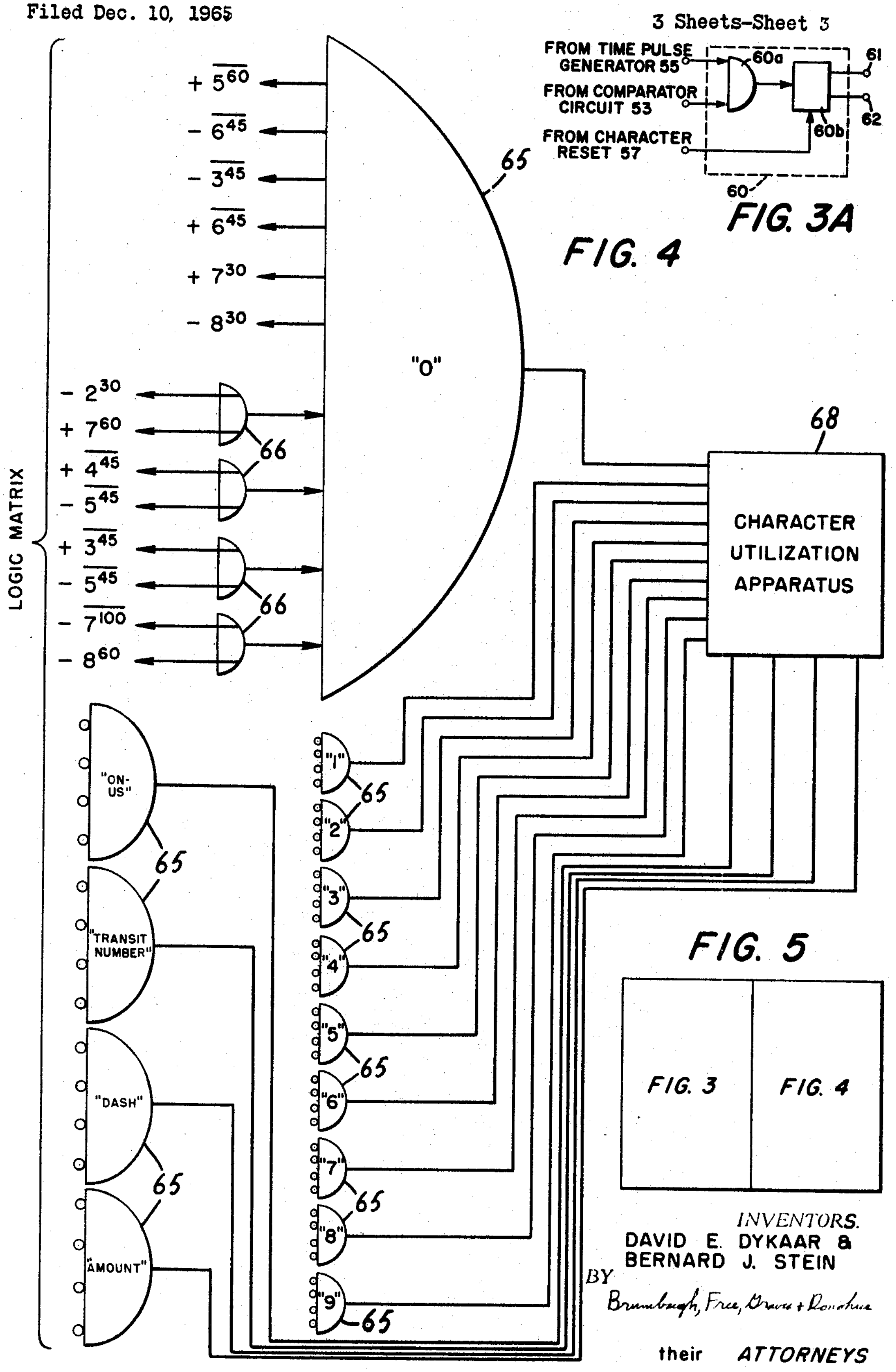
FIG. 3A is a block digram of each signal generator 60 in the block diagram of FIG. 3.
FIG. 5 shows the inter-relation of FIGS. 3 and 4.

Referring now to FIGS. 3 and 4, the analog electrical signal from the reading head 27 is first amplified by a conventional preamplifier 35 which is preferably physically mounted very close to the reading head 27 so as to maximize the signal-to-noise ratio and is then fed through a suitable low impedance line to a conventional amplifier 37, the output stage of the preamplifier 35 being an impedance matching network such as a conventional emitter-follower circuit, for example.

The output of the amplifier 37 is fed to a lead-edge trigger circuit 40 which preferably includes a conventional threshold amplifier having a fixed threshold level selected to prevent the false triggering of the associated circuitry by extraneous noise. The threshold amplifier drives a conventional pulse generator that in turn activates a gated clock circuit 42. The gated clock circuit 42 includes a "flip-flop" or bistable multivibrator which controls the operation of a conventional oscillator providing output pulses every 86.6 microseconds, i.e. the output pulses are successively spaced by the distance between the successive times $t_1$ through $t_8$.

The gated clock 42 drives an eight-stage counter drive 43, which is a conventional pulse generator suitable for driving a conventional eight-stage counter 44. In addition, the gated clock 42 drives a lead-edge peak detector circuit 46.

The output of the amplifier 37 is coupled through a conventional gate 48 (FIG. 6) to a conventional peak detector 49, the gate 48 being enabled by a gating pulse generator 50 which is triggered by the gated clock 42 in response to the output of the threshold amplifier of the lead edge-trigger circuit 40. Thus the peak amplitude of the first positive pulse at the time $t_1$ generated from each character is detected and stored by the peak detector 49. In order to insure that the stored voltage level is not disturbed by the pulses from the amplifier 37 occurring at the times $t_2$ through $t_8$, the values of the circuit components of the gating pulse generator 50, which may be a conventional "one-shot" multivibrator, are selected to provide a gating pulse of about 65 microseconds, for example.

The output of the peak detector 49 is fed to a reference percentage voltage generator 51. The reference percentage voltage generator includes a conventional inverter circuit and a plurality of voltage dividing networks to provide suitable reference voltage levels of both polarities which are 15%, 30%, 45%, 60%, 80% and 100% of the peak amplitude of the first positive $t_1$ pulse that is stored in the peak detector 49. The reference percentage voltage generator thus provides output reference voltage levels which are automatically adjusted to provide predetermined ratios of the peak amplitude of the first positive pulse regardless of the actual level of the output analog waveform of the amplifier 37.

Each of the reference voltage level outputs is supplied to one of a plurality of inputs of a different one of a plurality of comparator circuits 53, each of the comparator circuits corresponding to a particular polarity and relative magnitude level. The other one of the inputs to the comparators 53 is supplied by the output of the amplifier 37. The comparators 53 may be in the form of any conventional comparator circuit, and they provide a digital output whenever the analog signal representative of a given character at the output of the amplifier 37 is of the proper polarity and exceeds the magnitude of the respective reference voltage level.

The eight stage counter 44 may be of any conventional type known to the art, and provides time signals corresponding to the times $t_1$ through $t_8$ by means of selectively energized time pulse generators 55, which may by conventional "one-shot" multivibrators, for example. The eight-stage counter 44 also drives a character reset circuit 57 which resets the gated clock 42 by setting its bistable multivibrator in the state which disables its oscillator. The character reset circuit 57 also discharges the peak detector 49 so that it may detect and store the peak amplitude of the first positive pulse generated from the next character.

The determination of the polarity and relative magnitude of the output signal from the amplifier 37 at the times $t_1$ to $t_8$ is made by the digital signal generators 60. Each of the signal generators 60 (see also FIG. 3A) includes a conventional AND circuit 60*a*, one input of which is connected to the output of the corresponding time pulse generator 55, the other input being connected to a respective one of the comparator circuits 53 depending upon the polarity and relative magnitude of the signal. Each signal generator AND circuit 60*a* drives a conventional bistable multivibrator 60*b*, the inverse outputs of which appear at a pair of terminals 61 and 62. The multivibrator 60*b*, being bistable, stores the digital signals on the terminals 61 and 62 until the multivibrator is reset by the reset pulse generated at the time $t_9$ by the character reset circuit 57.

For the $(+2^{15})$ signal generator 60 to provide an output signal at the terminal 61, signifying that a particular character has a positive pulse at the time $t_2$, the amplitude of which is at least 15% of the amplitude of the first positive pulse at the time $t_1$, an input pulse is required from both the (+15%) comparator circuit 53 and the "2" time pulse generator 55. If there is no positive pulse at the time $t_2$ generated by a particular character, the (+2) terminal 62 always provides a "not" output signal.

Similarly, a signal on the terminal 61 of the (−2) signal generator 60 indicates that a negative pulse occurred at the time $t_2$ having an absolute magnitude at least 15% that of the peak amplitude of the first positive pulse, while a "not" signal on the terminal 62 thereof indicates the absence of a negative signal of such magnitude at time $t_2$. As mentioned above, there is always an initial positive signal, i.e. a "+1" signal, generated by each character and the final pulse is always negative, so that "−1" and "+8" signals can never be generated. Therefore, no signal generators 60 are provided for "+1", "−1", or "+8" signals.

As discussed above, a character is read by determining the polarity and relative magnitude of the waveform derived therefrom at the predetermined times $t_2$ to $t_8$. Thus when certain combinations of output signals from the signal generators 60 are present, a particular character is recognized. Selective combinations of outputs from the signal generators 60 are connected by means of a suitable logic matrix to characteristic AND circuits 65 for the numerals "0" to "9" and the four cue symbols in the illustrative example.

If all possible inputs to the AND circuits 65 were utilized to identify a character, there would be a very high probability of correctly reading that character, but there would also be a very high-non-read or reject rate. On the other hand, if a minimum number of digital signals representative of the logic for the detectable characters were used to identify a character, there would be a relatively low reject rate, but a very high misread rate. Experience has shown that the best way to optimize the logic for the digital signals required to identify a family of waveforms is empirically in order to select the amplitude weighting to maximize the recognition reliability. Of course, the similarity between waveforms of a particular group under consideration must be examined in order to determine whether the number of reference voltage levels and/or time intervals must be increased. Furthermore, the logic equation should be determined after examining the waveforms under typical conditions of noise and distortion. For example, noise can be caused by voids or extraneous ink, and inaccurate location of the characters on a document can cause the waveform to be shifted in time. An exemplary logic equation for the numeral "0" is as follows:

$$\text{Zero}=(-8^{30})\cdot(+7^{30})\cdot[(-2^{30})+(+7^{60})]\cdot(\overline{+6^{45}})\cdot(\overline{-3^{45}})\cdot(\overline{+5^{60}})\cdot(\overline{-6^{45}})\cdot[(\overline{+4^{45}})+(\overline{-5^{45}})]\cdot[(\overline{-7^{100}})+(-8^{60})]\cdot[(\overline{+3^{45}})+(\overline{-5^{45}})]$$

A bar over a designation signifies a "not" signal, i.e. a signal appearing at the terminal 62 of the signal generators 60. The expression "$(-8^{30}).(+7^{30})$" is the conjunctive or "AND" combination of the individual signals and means "$(-8^{30})$ AND $(+7^{30})$"; i.e. both of these signals are required inputs for the character "0". The expression "$(-2^{30})+(+7^{60})$" is the disjunctive or "OR" combination of the individual signals, and means "$(-2^{30})$ OR $(+7^{60})$"; i.e. either one of these signals is one of the required inputs for the character "0".

Note that when "not" signals are required to exist, a relatively high magnitude level is required, in order to prevent extraneous noise from causing a character not to be read. Also, it can be seen that if there is a relatively strong (+7) signal, at least 60%, there need be no (−2) signal. Furthermore, a "0" will be read even if the (−2), (+7), and (−8) signals are as low as 30% although the (−2) and (+7) signals should be at least 80% and the (−8) signal should be at least 100%. Noise is taken account of under such low signal level conditions by the "not" signals in the logic. The logic inputs for the "0" AND circuit 65 are indicated in FIG. 4. The "OR" inputs are provided through conventional "OR" circuits 66.

The outputs of the AND circuits 65 are supplied to a character utilization apparatus 68, which might be a computer, the pocket selection circuitry of a sorting apparatus, or the like and which may include conventional storage devices for storing the outputs of the AND circuits 65.

Thus there is provided novel and improved apparatus and methods in accordance with the invention for recognizing and identifying one of a plurality of waveforms, which has application, for example, in reading magnetizable and detectable characters on documents. The waveforms may be distorted in time as well as amplitude without adversely affecting a character reader in accordance with the invention, inasmuch as the waveforms are automatically normalized in accordance with the level of a predetermined portion thereof. As a result, a very large dynamic range is provided, there being no inherent limitation due to the waveform recognition system itself. Thus the dynamic range of the illustrative embodiment would be determined by the dynamic ranges of the preamplifier 35 and the amplifier 37.

It will be understood by those skilled in the art that the exemplary embodiment is susceptible of variation and modification without departing from the spirit and scope of the invention. For example, the character reading apparatus of the invention may be readily adapted to read magnetic ink characters of other shapes, such as the bar code system of the CMC–7 type font, by suitably arranging the logic matrix to require appropriate combinations of digital signals to represent each character. In this regard, the logic matrix may be fabricated in the form of a plugboard in order to facilitate arranging an appropriate logic for each system of characters to be read. Any suitable technique of transduction which generates analog waveforms characteristic of detectable characters may be used with the circuitry disclosed herein to read the characters. The analog- to-digital conversion technique of this invention thus offers wide applications for character reading apparatus. In addition, portions of the circuitry disclosed herein may be used for analog-to-digital conversion generally. Therefore, the invention is not deemed to be limited except as defined by the appended claims.

We claim:

1. A method for reading detectable characters on a document, comprising the steps of exposing the characters to a transducer, generating an analog electrical signal susceptible of variation within a wide dynamic range and representative of each character exposed to the transducer, generating at least one reference voltage level which is directly related to predetermined portion of the electrical signal generated from the particular character being read, comparing the amplitude of the electrical signal with the reference voltage level, generating timing signals at predetermined times relative to the beginning of the electrical signal during which times the reference voltage level is effective, and generating digital signals at least some of which are representative of the presence of the analog signal at levels exceeding the reference voltage level at different ones of the predetermined time intervals.

2. The method as claimed in claim 1, including the step of generating a signal to identify each character in response to at least one digital signal.

3. The method as claimed in claim 1, including the step of generating a signal to identify each character in response to the presence of at least one digital signal and to the absence of at least one other digital signal.

4. The method as claimed in claim 1, wherein the reference voltage level is a predetermined percentage of the level of a predetermined portion of the analog signal.

5. The method as claimed in claim 4, wherein the predetermined portion of the analog signal is the initial portion thereof.

6. A method for reading detectable characters on a document, comprising the steps of exposing the characters to a transducer, generating an analog electrical signal representative of each character exposed to the transducer, determining the polarity and the relative amplitude of the electrical signal with respect to at least one predetermined reference voltage level which is directly related to a predetermined portion of the electrical signal generated from the particular character being read, generating a series of timing signals at selected times relative to the beginning of the electrical signal during which times the reference voltage level is effective and of constant magnitude, and generating digital signals at least some of which are representative of the polarity of the electrical signal and the relative amplitude of the electrical signal with respect to the predetermined reference voltage level coincident with the occurrence of the timing signals.

7. The method as claimed in claim 6, wherein the relative amplitude determining step further includes the steps of generating at least one reference voltage level effective at the selected times relative to the beginning of the electrical signal, and comparing the amplitude of the electrical signal with the reference voltage level.

8. The method as claimed in claim 6, including the step of generating signals identifying the characters in response to predetermined ones of the digital signals.

9. A method for converting analog data to digital form, comprising the steps of generating an analog electrical signal susceptible of variation within a wide dynamic range in response to and representative of the analog data, generating a plurality of reference voltage levels which are predetermined percentages of a predetermined portion of the electrical signal, comparing the amplitude of discrete portions of the electrical signal with the reference voltage levels to determine the relative amplitude of the electrical signal, generating timing signals at selected times relative to the beginning of the electrical signal, the reference voltage levels being effective at the selected times, and generating digital signals at least some of which are representative of the relative amplitude of the discrete portions of the electrical signal coincident with the occurrence of different ones of the timing signals.

10. The method as claimed in claim 9, wherein the petermined portion of the electrical signal is the initial portion thereof.

11. In apparatus for sorting documents in accordance with detectable characters on each document including transducer means for generating analog electrical signals in response to and representative of each character exposed thereto, means for feeding the documents to said transducer means so as to expose each character thereto, a plurality of pockets adapted to receive the sorted documents, means for conveying the documents from said transducer means along a path past the entrance of said pockets, a plurality of pocket gates each of which is adapted to be actuated by a corresponding pocket selection signal to guide a document from the path into a different one of said pockets in accordance with at least one character on the document, and means responsive to character identifying signals for generating the pocket selection signal, the combination therewith of means for generating a plurality of reference voltage levels which are predetermined percentages of a predetermined portion of the analog signal, means for comparing the amplitude of the analog signal with the reference voltage levels, means for generating timing signals at predetermined times relative to the beginning of the analog signal during which times the reference voltage levels are effective, means responsive to said comparing means and to said timing signal generating means for generating digital signals at least some of which are representative of the relative amplitude of portions of the analog signal at different ones of the predetermined times, and means responsive to the digital signals for generating the character identifying signals.

12. Apparatus for converting analog electrical signals of variable polarity and magnitude to digital signals, comprising means for sensing the polarity of predetermined portions of each analog electrical signal and for sensing the relative magnitude of the predetermined portions with respect to predetermined reference voltage levels which are a function of the analog electrical signal, means for generating timing signals at predetermined times relative to the beginning of the electrical signal, and means responsive to said sensing means and to said timing signal generating means for generating digital signals at least some of which are representative of the polarity of the predetermined portions of the electrical signal and representative of their relative magnitude with respect to the predetermined reference voltage levels at different ones of the predetermined times relative to the beginning of the electrical signal.

13. Apparatus as claimed in claim 12, including means for storing the digital signals.

14. Apparatus as claimed in claim 12, wherein said digital signal generating means generates first signals indicating the presence of an electrical signal of predetermined polarity and signal level and second signals indicating the absence of an electrical signal of predetermined polarity and signal level.

15. Apparatus as claimed in claim 12, wherein said sensing means includes means for generating the predetermined reference voltage levels, and means for comparing the amplitude of the electrical signal with the predetermined reference voltage levels.

16. Apparatus as claimed in claim 15, wherein said reference voltage level generating means generates a plurality of reference voltage levels which are predetermined percentages of the level of a predetermined portion of the electrical signal, the electrical signal being susceptible of variation within a wide dynamic range.

17. Apparatus as claimed in claim 16, wherein the predetermined portion of the electrical signal is the initial portion thereof.

18. Apparatus for reading detectable characters on a document, comprising transducer means for generating an analog electrical signal of magnitude susceptible of variation within a wide dynamic range in response to and representative of each character exposed thereto, means for exposing each character to said transducer means, means for measuring the magnitude of a portion of the analog electrical signal occurring at a predetermined time interval relative to the beginning thereof, means responsive to said magnitude measuring means for establishing at least one predetermined reference voltage level which is a predetermined percentage of the measured portion of the analog electrical signal generated from the particular character being read, means for comparing the magnitude of the analog signal with the predetermined reference voltage level, means for generating timing signals at different predetermined time intervals relative to the beginning of the analog electrical signal during which time intervals the reference voltage level is effective and constant magnitude, and means responsive to said magnitude comparing means and said timing signal generating means for generating digital signals at least some of which are representative of the relative magnitude of the analog signal at different ones of the respective time intervals.

19. Apparatus as claimed in claim 18, including means for storing the digital signals.

20. Apparatus as claimed in claim 18, including means responsive to at least one of the digital signals for generating signals identifying the characters.

21. Apparatus as claimed in claim 18, wherein said reference voltage establishing means automatically adjusts the level of the reference voltage in accordance with the amplitude of the measured portion of the analog signal.

22. Apparatus as claimed in claim 21, wherein the predetermined portion of the analog signal is the initial portion thereof.

23. Apparatus for recognizing waveforms of variable polarity and magnitude, comprising means responsive to the beginning of a waveform for generating a plurality of timing signals, counter means responsive to the timing signals, means for determining the polarity and relative magnitude of the waveform with respect to at least one reference voltage level which is a function of the waveform and which is effective when the timing signals are generated, and means responsive to said counter means and to said polarity and magnitude determining means for generating digital signals representative of the polarity and relative magnitude of the waveform at selected times relative to the beginning thereof.

24. Apparatus as claimed in claim 23, including means responsive to a plurality of said digital signals for generating a signal identifying the waveform.

25. Apparatus as claimed in claim 23, including means for disabling said timing signal generating means and for resetting said digital signal generating means after each waveform is recognized.

26. Apparatus for reading detectable characters on a document, comprising transducer means for generating an analog electrical signal of variable polarity and magnitude susceptible of variation within a wide dynamic range in response to and representative of each character exposed thereto, means for exposing each character to said transducer means, means for measuring the amplitude of a predetermined portion of the analog electircal signal, means responsive to said amplitude measuring means for establishing at least one predetermined reference voltage level of predetermined polarity, means for determining the relative magnitude of the analog signal with respect to the predetermined reference voltage level and for determining the polarity of the analog signal, means for generating timing signals at predetermined times relative to the beginning of the analog signal during which times the reference voltage level is effective and of constant magnitude, and means responsive to said polarity and relative magnitude determining means and said timing signal generating means for generating digital signals at least some of which are representative of the polarity and relative magnitude of the analog signal at different ones of the predetermined times relative to the beginning of the analog signal.

27. Apparatus as claimed in claim 26, wherein the predetermined portion of the analog signal is the initial portion thereof.

28. In apparatus for handling data on documents including transducer means for generating analog electrical signals susceptible of variation within a wide dynamic range in response to and representative of the data exposed thereto, and means for feeding the documents to said transducer means so as to expose the data thereto, the combination therewith of means for establishing at least one predetermined reference voltage level in response to a predetermined portion of each analog electrical signal, means for comparing the amplitude of the analog signal with the predetermined voltage level, means for generating timing signals at predetermined times relative to the beginning of the analog signal during which times the reference voltage level is effective, and means responsive to said comparing means and said timing signal generating means for generating digital signals at least some of which are representative of the relative amplitude of the discrete portions of the analog signal coincident with the occurrence of different ones of the timing signals.

29. Apparatus as claimed in claim 28, wherein the predetermined portion of the analog signal is the initial portion thereof.

30. Apparatus for recognizing waveforms of variable polarity and magnitude, comprising means responsive to the beginning of a waveform for generating a plurality of timing signals, means for determining the polarity and relative magnitude of the waveform with respect to at least one reference voltage level which is based on a predetermined portions of the waveform and which is effective when the timing signals are generated, means responsive to said timing signal generating means and to said polarity and magnitude determining means for generating digital signals representative of the polarity and relative magnitude of the waveform at selected times relative to the beginning thereof, and means responsive to predetermined ones of the digital signals for generating a waveform recognition signal.

References Cited

UNITED STATES PATENTS

| | | | |
|---|---|---|---|
| 2,927,303 | 3/1960 | Elbinger | 340—149 |
| 2,985,298 | 5/1961 | Schreiner | 209—72 |
| 3,096,506 | 7/1963 | Chao Kong Chow et al. | 340—146.3 |
| 3,114,132 | 12/1963 | Trimble et al. | 340—146.3 |

MAYNARD R. WILBUR, Primary Examiner

R. F. GNUSE, Assistant Examiner

U.S. Cl. X.R.

324—77

PO-1050
(5/69)

UNITED STATES PATENT OFFICE
CERTIFICATE OF CORRECTION

Patent No. 3,535,682 Dated October 20, 1970

Inventor(s) David E. Dykaar et al

It is certified that error appears in the above-identified patent and that said Letters Patent are hereby corrected as shown below:

Col. 5, line 51, "high-non-read" should be --high non-read--;
Col. 6, line 72, "to predetermined" should be --to a predetermined--;
Col. 9, line 4, "and constant" should be --and of constant--;
Col. 9, line 50, "electircal" should be --electrical--; and
Col. 10, line 38, "portions" should be --portion--.

SIGNED AND
SEALED
FEB 9 1971

(SEAL)
Attest:

Edward M. Fletcher, Jr.
Attesting Officer

WILLIAM E. SCHUYLER, JR.
Commissioner of Patents